(12) United States Patent
Heuschmid et al.

(10) Patent No.: US 11,054,034 B2
(45) Date of Patent: Jul. 6, 2021

(54) FLAT GASKET AND INTERNAL COMBUSTION ENGINE HAVING SUCH A FLAT GASKET

(71) Applicant: REINZ-DICHTUNGS-GMBH, Neu-Ulm (DE)

(72) Inventors: Michael Heuschmid, Neu-Ulm (DE); Kurt Hoehe, Langenau (DE); Wilhelm Krautmann, Roefingen (DE); Wilhelm Kuhn, Tomerdingen (DE); Jochen Salzmann, Neu-Ulm (DE); Hans Waldvogel, Krumbach (DE)

(73) Assignee: Reinz-Dichtungs GmbH, Neu-Ulm (DE)

( * ) Notice: Subject to any disclaimer, the term of this patent is extended or adjusted under 35 U.S.C. 154(b) by 177 days.

(21) Appl. No.: 16/320,225

(22) PCT Filed: Jul. 31, 2017

(86) PCT No.: PCT/EP2017/069356
§ 371 (c)(1),
(2) Date: Jan. 24, 2019

(87) PCT Pub. No.: WO2018/024689
PCT Pub. Date: Feb. 8, 2018

(65) Prior Publication Data
US 2019/0271397 A1    Sep. 5, 2019

(30) Foreign Application Priority Data
Aug. 2, 2016 (DE) .................. 20 2016 104 243.7

(51) Int. Cl.
*F16J 15/08* (2006.01)

(52) U.S. Cl.
CPC ....... *F16J 15/0818* (2013.01); *F16J 15/0881* (2013.01)

(58) Field of Classification Search
CPC ... F16J 15/0818; F16J 15/0881; F16J 15/0825
See application file for complete search history.

(56) References Cited

U.S. PATENT DOCUMENTS

| 4,335,890 A | * | 6/1982 | Nicholson | ............ F16J 15/0825 277/595 |
| 4,856,796 A | * | 8/1989 | Genin | .................... F02F 11/002 277/598 |
| 5,267,740 A | * | 12/1993 | Stritzke | ................ F16J 15/0818 277/316 |

(Continued)

FOREIGN PATENT DOCUMENTS

| DE | 202008005712 U1 | 9/2009 | |
| GB | 2278651 A | * 12/1994 | .............. F16L 23/18 |

(Continued)

OTHER PUBLICATIONS

European Patent Office, International Search Report and Written Opinion in Application No. PCT/EP2017/069356, dated Oct. 30, 2017, 15 pages, Rijswijk Netherlands.

*Primary Examiner* — Eugene G Byrd
(74) *Attorney, Agent, or Firm* — Marshall & Melhorn, LLC (57) ABSTRACT

Flat gaskets for internal combustion engines are described. The flat gaskets may be used in internal combustion engines, in particular in engines with liners.

19 Claims, 9 Drawing Sheets

(56) References Cited

U.S. PATENT DOCUMENTS

| | | | |
|---|---|---|---|
| 6,179,299 B1* | 1/2001 | Schweiger | F02F 11/002 |
| | | | 277/598 |
| 8,757,634 B2* | 6/2014 | Egloff | F16J 15/0825 |
| | | | 277/594 |
| 2005/0116427 A1 | 6/2005 | Seidel et al. | |
| 2006/0145428 A1* | 7/2006 | Dudman | F16L 23/22 |
| | | | 277/626 |
| 2008/0237998 A1* | 10/2008 | Chen | F16J 15/0818 |
| | | | 277/595 |
| 2009/0302551 A1* | 12/2009 | Salameh | F16J 15/0818 |
| | | | 277/592 |
| 2010/0019459 A1* | 1/2010 | Salameh | F16J 15/122 |
| | | | 277/592 |
| 2015/0123354 A1* | 5/2015 | Laser | H01J 49/24 |
| | | | 277/648 |
| 2015/0316150 A1* | 11/2015 | Zhao | F16J 15/0887 |
| | | | 277/648 |
| 2016/0178059 A1* | 6/2016 | Swasey | F16J 15/0818 |
| | | | 277/593 |
| 2016/0223111 A1* | 8/2016 | Karoliussen | F16J 15/0806 |

FOREIGN PATENT DOCUMENTS

| | | | | |
|---|---|---|---|---|
| JP | 58050361 A | * | 3/1983 | F16J 15/0818 |
| JP | 2005201448 A | * | 7/2005 | B21D 22/04 |
| JP | 2006170442 A | * | 6/2006 | F16J 15/0825 |
| WO | 2010149774 A1 | | 12/2010 | |

* cited by examiner

FLAT GASKET AND INTERNAL COMBUSTION ENGINE HAVING SUCH A FLAT GASKET

BACKGROUND

The present invention relates to flat gaskets and internal combustion engines. The flat gaskets according to the invention are used for example in internal combustion engines, in particular in engines with liners.

In internal combustion engines, usually a flat gasket is inserted between the crankcase and the cylinder head, said flat gasket sealing the gap between the crankcase and the cylinder head. In the commercial vehicle sector, use is usually made of crankcases which have inserted liners. Due to the much greater rigidity of the cylinder head, crankcase and liners in comparison to cars, and due to the fact that greater bolt forces are available, uncoated cylinder head gaskets are traditionally used in commercial vehicle engines. The surface of the liners used is usually turned, while the surface of the cylinder head and of the crankcase is milled. Thus, in engines with liners, for example, which are often used in commercial vehicles, the liners may have concentrically running groovings which are specifically formed on the surface facing towards the flat gasket. Such groovings may have very steep flanks. If, in the case of liners, the groovings run concentrically around the combustion chambers, a good seal around the through-opening of the combustion chamber is usually achieved by the surface of the cylinder head gasket that faces towards the liner. In contrast, the milled machining grooves on the surface of the cylinder head or crankcase that faces towards the flat gasket are not concentric.

To improve the seal between the cylinder head and the flat gasket, in the prior art a sealing layer is used as the layer facing towards the cylinder head, which sealing layer has, in a manner running around the cylinder head, a bead, a thickening or a corrugated profiling in order to increase the pressure and/or to limit the deformation (stopper).

If the components to be sealed have a low degree of roughness, the increase in pressure achieved through such embossed structures is sufficient for a reliable seal. If the components to be sealed have a considerable roughness, in particular also in the case of highly undulating surfaces of the components to be sealed, adaptation of the surface of the flat gasket to the machining grooves in the opposite surface of the cylinder head is hardly possible since said embossed structures are too stiff or too coarse.

Similar sealing problems also occur in other technical fields in which flat gaskets are used.

SUMMARY

It is therefore an object of the present invention to provide a flat gasket by which the abovementioned problems are solved. It is a further object of the present invention to provide a suitable sealing construction and also a suitable internal combustion engine in which the solution according to the invention is implemented.

This object is achieved by the flat gasket and by the internal combustion engine according to the claims. Advantageous developments of the flat gasket according to the invention or of the internal combustion engine according to the invention are given in the respective dependent claims.

The flat gasket according to the invention serves for sealing between mutually facing surfaces, for example of a crankcase including a liner on the one hand and of a cylinder head on the other hand, for example around a through-opening which passes through the entire flat gasket, such as a combustion chamber opening for example. However, the flat gasket according to the invention can, as a cylinder head gasket, also serve for sealing other through-openings, such as, for example, coolant openings, through-openings for oil, or screw holes.

In a first variant, the flat gasket according to the invention has a metal layer. Further metal layers are possible, but not mandatory. Said metal layer has on a first side or surface at least one first region which runs around the through-opening. Said first region may be implemented without any increase in height in relation to the laterally adjoining regions in the layer plane, but it may also be raised in relation to the adjoining surface, in particular convexly raised.

According to the first variant, the first region or each region designated as a first region has on the first surface a profiling which is integrally formed in said surface. In this first region, the profiling extends around the through-opening and has at least two elevations, between which a depression is provided. Optionally, the number of elevations may also be greater than two, wherein in each case a depression is provided between each two adjacent elevations. Elevations and depressions run parallel to one another around the through-opening and are each intrinsically closed. However, they may also run in a closed manner around a group of multiple through-openings.

The elevations according to the invention are therefore not embossed beads, but rather are formed by a grooving of the first surface. Said grooving increases the contact pressure of the flat gasket on the adjacent component surface, for example of the cylinder head, and thus leads to an improved adaptation of the flat gasket and of the adjoining surface with respect to one another. In particular, the grooving may also penetrate into surface structures such as, for example, machining grooves in the adjacent surface and thereby forms additional, improved sealing lines.

The introduction of such groovings requires no additional machining steps beyond the stamping and embossing of the metal layer, as usually carried out in order to produce through-openings and sealing beads and the like. The present invention can therefore be implemented easily and inexpensively and without additional machining steps, but significantly increases the contact between the flat gasket and the adjacent component, such as a cylinder head for example, and leads to improved sealing.

In a first variant of the invention, the first region, as already mentioned, may, apart from the groovings, be flat in relation to the adjoining regions of the first surface of the metal layer.

In a second variant, said metal layer may have on its first surface a raised, in particular convexly raised, first region running around the through-opening. On the opposite side of said metal layer, a second region is formed. The latter may in particular be concavely recessed directly opposite the raised first region. In this case, the raised height of the first region and the recessing of the second region may together form a kind of bead or other embossment, for example an embossment which, to a rough approximation, is omega-shaped in cross-section through the layer. However, this is not mandatory; the second region may instead also be level with the second surface laterally adjacent to the second region.

The profiling according to the invention may for example also be formed in the raised region of an embossed sealing element, such as for example of an aforementioned omega-shaped embossment, since the width of the grooving according to the invention is much smaller than the width of a top of such a bead-like element, also referred to below as an omega embossment. The omega embossment usually has a width that corresponds to between 70% and 150% of the layer thickness of the corresponding sealing layer.

To form an omega-shaped embossment, usually a concave depression of similar width is formed on the second surface of the metal layer located opposite the raised region. Here, a concave depression is always to be understood to mean a macroscopic depression having a depth of more than 75 µm, and thus differs from a microscopic depression of the profiling or grooving that has a depth of up to 75 µm.

In the profiling according to the invention, the number of elevations and depressions can be varied as required, according to the sealing requirements. As already mentioned, the grooving may be formed on one side, but also optionally on both sides. On the second surface, an optional additional grooving may be formed both in the layer plane, in particular adjacent to the profiling in the first surface. The profiling according to the invention is not a sealing bead or a sequence of sealing beads, but rather is a profiling of the surface in question, preferably in the micrometre range. In particular, each elevation or each depression may advantageously have a depth of 30 to 75 µm and/or a width of 120 to 300 µm, in each case including or excluding the range boundaries. In particular, it is advantageous if the height difference between an elevation and an adjacent depression (hereinafter referred to as the "corrugation amplitude") is less than ¼ of the sheet thickness of the metal layer adjacent to the elevation and depression, that is to say less than ¼ of the initial sheet thickness before forming the elevations and depressions of the grooving. In particular, it is advantageous if the material used for the metal layer is a carbon steel, stainless steel or a non-spring-tempered stainless steel, in each case having a tensile strength of ≤1100 N/mm$^2$, preferably of ≤950 N/mm$^2$, since, for the profiling according to the invention, no elastic properties are necessary or are even disadvantageous.

A flat gasket according to the first variant, that is to say without a raised region of the first surface in the first region, can be used with advantage if the surface of the adjacent component, for example of the crankcase or in particular of the liner, that is to be sealed and that is located opposite the second surface has in the region of the profiling a raised area that runs parallel to the profiling. As a result of this raised area, when assembling the component with the flat gasket, an increased pressure is exerted on the regions of the flat gasket that have the profiling. As a result, the profiling is in turn pressed with an increased pressing force against the surface of the component, for example of the cylinder head, that is adjacent to the first surface of the flat gasket, so that the recesses located in said surface, in particular the microscopic depressions located therein, are sealed by the profiling according to the invention.

Such a bulge or raised area of the surface is advantageously configured as a continuous raised area on the surface of the crankcase or of the liner, but it may also be a stepped raised area in the crankcase or in the liner, for example a circumferential raised area with flanks that slope at approximately 90°. However, it is not the recess between the main body of the crankcase and the liner.

Both variants of the flat gasket according to the invention can advantageously be developed as follows.

In one embodiment, both surfaces of the at least one layer of the flat gasket have profilings according to the invention. On the first surface, the profiling according to the invention extends as described above in the first, optionally convexly raised region. The region of the surface of the layer in question that is located opposite the first region is referred to here as the second region. The first and second region extend radially, relative to the through-opening to be sealed, over at least substantially the same area but on opposite surfaces of the same layer. The profiling of the second surface advantageously extends—in a respective projection of the profilings into the neutral axis of the layer—not in the same areas as the profiling of the first surface but rather laterally offset therefrom in a region referred to here as the third region. In particular, the profiling of the second surface does not result from the profiling of the first surface. If the first region is convexly raised, the profiling does not extend into the concave depression or the resulting concave recess of the second surface that may result from the convex raising of the first surface.

In a particularly advantageous embodiment, the individual elevations of the inventive profiling of the first region and/or of the third region have a different height in relation to the surrounding surface of the flat gasket. In particular, it is advantageous if the middle elevation of the profiling—if there is an odd number of elevations in the profiling—or the middle two elevations of the profiling—if there is an even number of adjacent elevations in the profiling—are the highest elevations among the elevations of the profiling. If profilings according to the invention are arranged in both surfaces of the flat gasket, the corrugation amplitudes of the profiling on the first side of the flat gasket may advantageously be different from, for example smaller than, the corrugation amplitudes of the profiling on the second surface of the flat gasket. The specific corrugation amplitude depends on the roughness provided in the respective adjoining component and will preferably be selected such that it is greater than the maximum roughness depth of the respective adjoining component.

The width of the individual elevations and depressions arranged next to one another in a surface may also be different. In addition, if both surfaces of the layer contain profilings, as described above, the widths of the elevations and depressions of the profilings on the two surfaces may be different. Likewise, the number of elevations on the two surfaces may be different.

As described above, the profiling according to the invention in the first and/or second surface of the flat gasket runs around a through-opening. It is not necessary for the profiling to run around the through-opening in a linear or circular manner. Instead, it is also possible to select any shape for the course of the profiling, for example a meandering profiling. What is important is that the through-opening is surrounded in an intrinsically closed manner.

The sealing construction according to the invention is particularly effective when the profiling on the first surface of the flat gasket rests directly on the surface of the adjacent component, for example a cylinder head, without further layers being arranged therebetween.

Some examples of flat gaskets according to the invention and of internal combustion engines according to the invention will be given below. Identical or similar reference signs will be used for identical or similar elements, and therefore the description of the reference signs will in some cases not be repeated. Lowercase letters distinguish elements that are present more than once; prime, asterisk and degree symbols are used only to distinguish between multiple depressions or elevations within a profiling. In addition to the features of the present invention which are essential according to the independent claims, the following examples also show in each case a number of optional developments in combination with one another. However, it is also possible to develop the present invention by just one of the optional features or also to develop it by combining the illustrated optional features within one example or else by combining different optional features in different examples. The edges of the through-opening are depicted in a simplified manner as straight edges, although in practice they are usually ring-shaped, in particular approximately circular.

DETAILED DESCRIPTION

Figure 5:
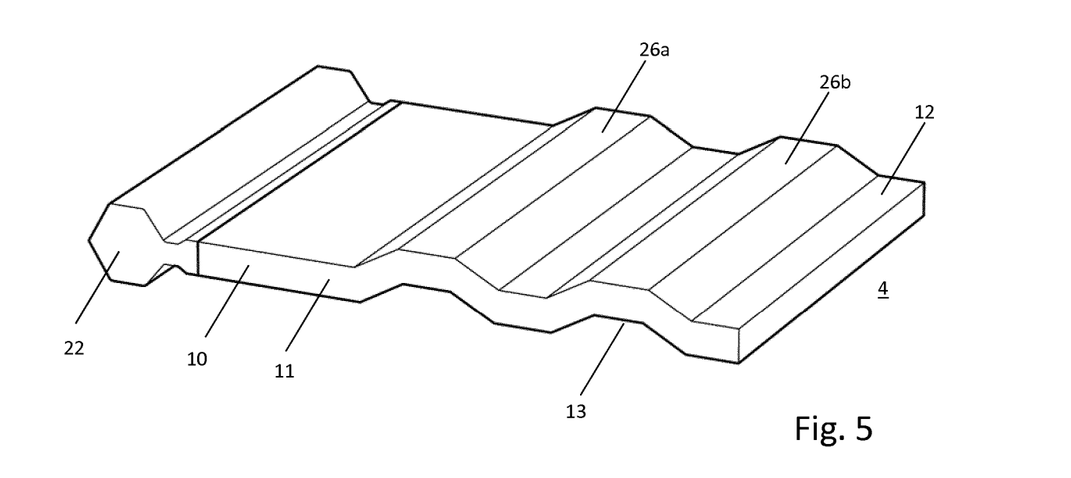
FIG. 5 shows a flat gasket according to the prior art.

FIG. 5 shows a flat gasket according to the prior art, wherein a portion that runs around a combustion chamber opening is shown. The flat gasket 10 has a single metal layer 11, which has a first surface 12 and a second surface 13 as well as two sealing beads 26a and 26b running around a combustion chamber 4. The two sealing beads run parallel to one another and in a closed manner around the combustion chamber 4 (not shown in detail here), wherein both sealing beads 26a and 26b are raised in the direction of the cylinder head that is located adjacent to the first side 12. The bead top of the beads 26a and 26b bears against the surface of the cylinder head. The metal layer 10 is made of spring-tempered steel in order to ensure a sufficient elasticity of the sealing beads 26a and 26b. However, this make it more difficult for the sealing beads 26a and 26b to press sufficiently with their bead top into microscopic depressions in the surface of the cylinder head, for example into machining grooves of the cylinder head. Sealing between the metal layer 11 and the cylinder head is therefore possible only to an unsatisfactory extent.

Figure 1:
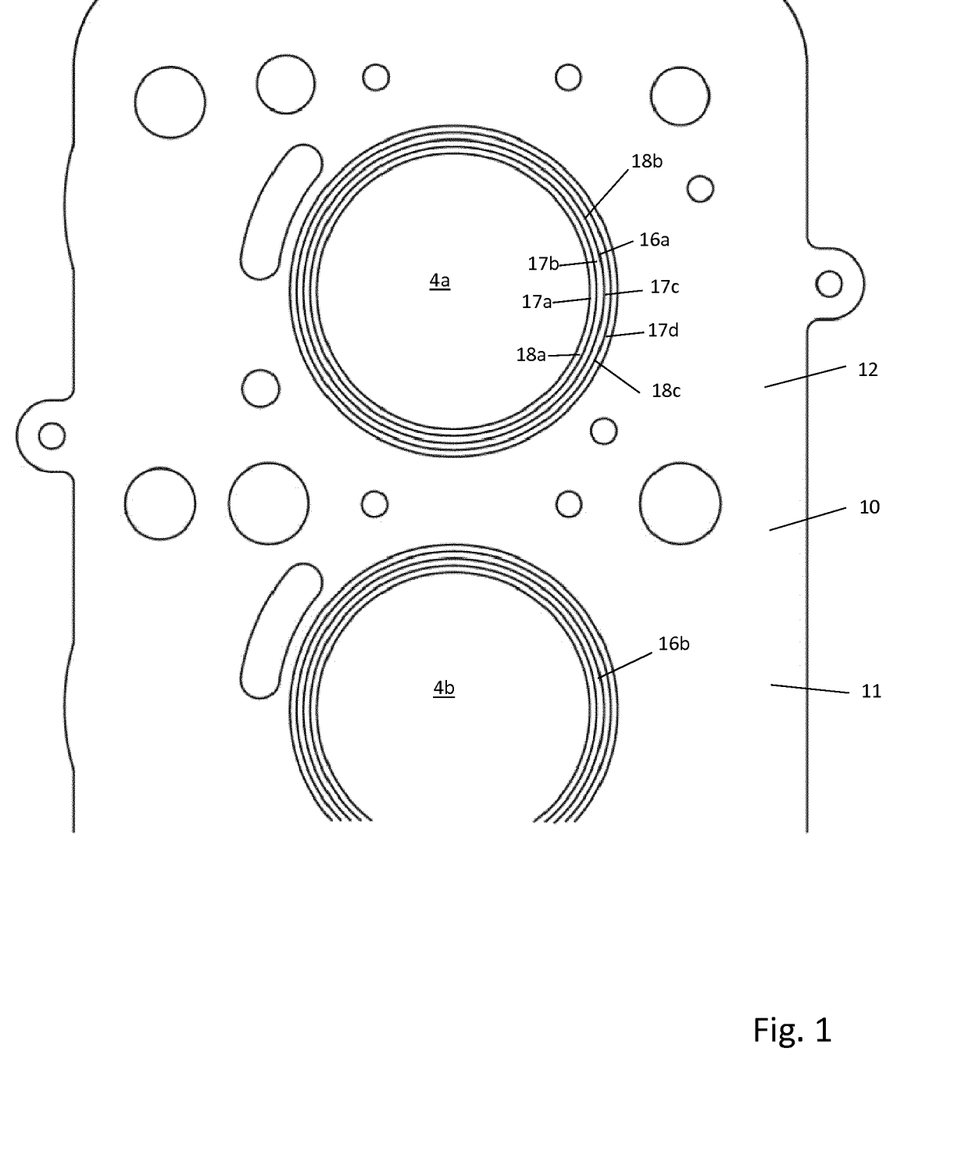
FIG. 1 shows a flat gasket according to the invention in a plan view of the first surface.

In contrast, FIG. 1 shows a flat gasket according to the present invention, in plan view of the first surface 12 which faces towards the cylinder head. A profiling 16a and 16b is arranged around each of the combustion chamber through-openings 4a and 4b, said profilings surrounding the respective combustion chamber through-opening 4a and 4b in a closed manner. Hereinbelow, an explanation will be given substantially in respect of the profiling 16a, the profiling 16b being configured in the same manner.

The profiling 16a comprises a grooving with elevations and depressions, wherein a total of four elevations 17a, 17b, 17c, 17d are separated from one another by three depressions 18a, 18b and 18c. The elevations and depressions run parallel to one another and circularly in a closed manner around the combustion chamber opening 4a. However, it is also possible to configure the elevations and depressions to run in a different shape, for example in a meandering shape, as shown by way of example in FIG. 3B. In FIG. 1, only the illustrated first surface 12 is profiled in the manner shown, while the second surface (not shown) of the metal layer 11 is smooth opposite the profiling.

FIGS. 2A to 2I show, in a cross-section of a portion thereof, a plurality of possible embodiments of the present invention.

Figure 2A:
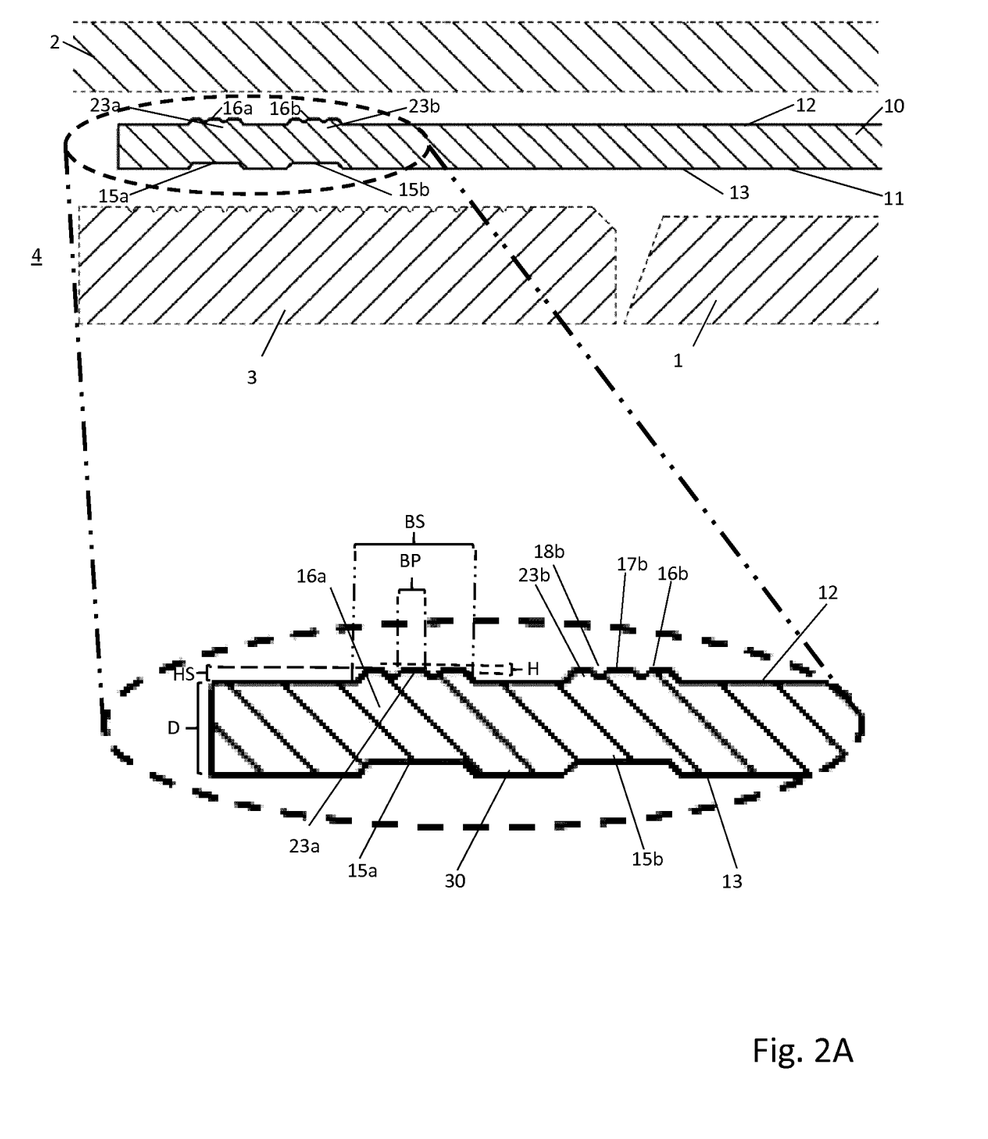
FIG. 2A to 2J show portions of different flat gaskets and internal combustion engines according to the invention, in cross-section.

FIG. 2A shows a crankcase 1 with a liner 3. Located opposite this is a cylinder head 2. Groovings 5 are produced in the liner 3 by rotary machining, said groovings leading to an increase in pressure between a metal layer 11 of a flat gasket 10 and the surface of the liner 3. To further improve this sealing, the second surface 13 of the metal layer 11 has two concavely recessed regions 15a and 15b, hereinafter also referred to as second regions, between which a web runs circumferentially. Upon assembly of the internal combustion engine, said web now experiences an increased pressing force on the surface of the liner 3.

Provided on the first surface 12 of the single metal layer 11 of the flat gasket 10 are two first regions 23a and 23b, which are raised. In the region comprising in each case one raised region and one concavely recessed region, the metal layer forms an omega embossment over its entire thickness. Each of said convexly raised first regions has a profiling 16a or 16b according to the invention with three elevations and two depressions. Due to these profilings 16a and 16b, the sealing layer 11 experiences an increased pressure on the adjacent surface of the cylinder head 2, so that the profilings 16a and 16b can dig into the surface of the cylinder head 2 and can reliably seal said surface.

The detail view in the bottom part of FIG. 2A shows in detail the region of the metal layer 11 that is bounded by a dashed circle in the top part of the figure. The height H of an elevation 17 relative to a depression 18, the height HS of a convexly raised first region 23 and also the sheet thickness D of the metal layer are in particular also shown therein. Also indicated are the width BP of an elevation 17 and the width BS of a convexly raised first region 23. Here, the width BP of the elevations and of the depressions is in each case approximately 125 µm, and the total width BS of the convexly raised area is approximately 625 µm. The height H of the elevations relative to the lowest point of the depressions is approximately 75 µm. The limbs of the omega embossment slope by more than 50°, which is very steep in comparison to the beads 26 of the prior art.

Figure 2B:
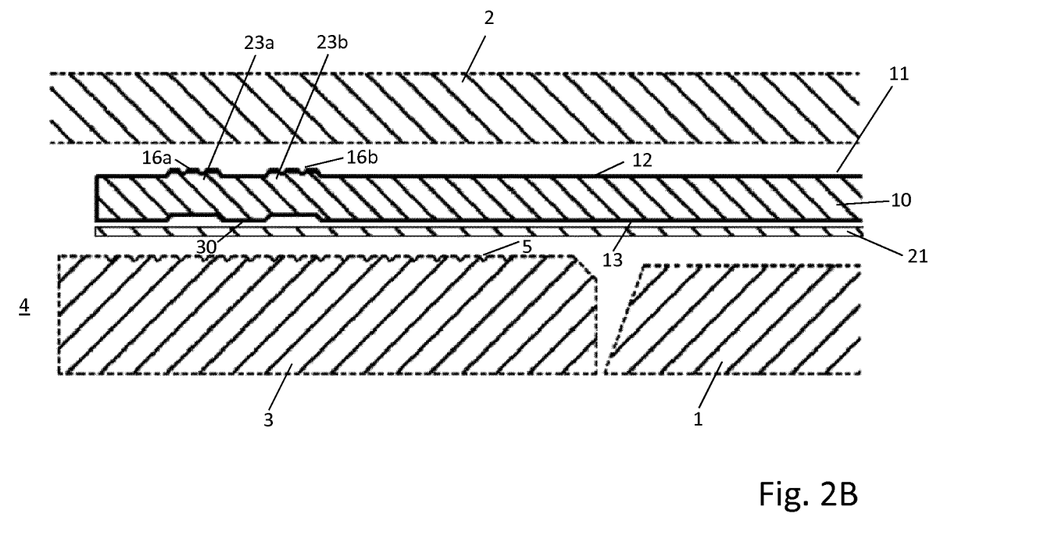

FIG. 2B shows a sealing construction as in FIG. 2A, but now the flat gasket 10 has a further metal layer 21 in the form of a smooth sheet, which is arranged between the crankcase 1, 3 and the metal layer 11. Here, as in the following examples of figure group 2 which have at least one separate convexly raised region 23, that is to say in all figures of figure group 2 with the exception of FIGS. 2E and 2F, this sealing construction is implemented in the form of an omega embossment.

Figure 2C:
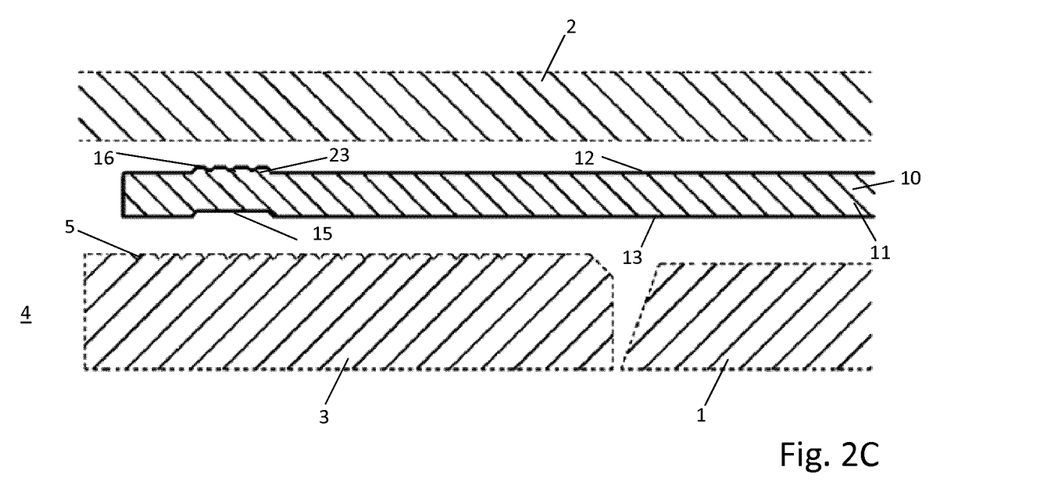

FIG. 2C shows a further flat gasket 10 according to the invention, which is configured in the same way as the flat gasket in FIG. 2A. In a manner differing from FIG. 2A, however, the metal layer 11 has on the first surface 12 only a single region 23 that has a raised area with a profiling 16 which now includes four elevations and three depressions on the first surface 12. On the second region 15 located opposite the first region 23 of the first surface 12, that is to say on the second surface 13, the metal layer 11 has a concave depression or an indent. The total width BS of the convexly raised region 23 is 900 µm, and the width BP of an elevation is, as before, approximately 120 µm. The height HS of the convexly raised region is 120 µm, and the height H of an elevation relative to an adjacent depression is 50 µm.

Figure 2D:
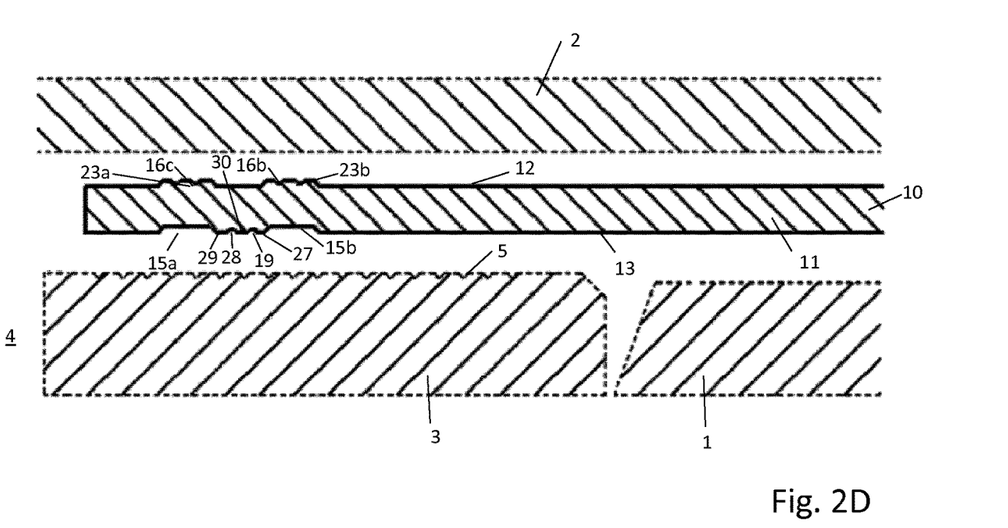

FIG. 2D shows a further flat gasket 10 according to the invention, corresponding to that in FIG. 2A. In addition, however, the region between the two second regions 15a and 15b, that is to say in the web 30 as a third region laterally adjacent to at least one second region, has a second profiling 19 with three elevations 27 and two depressions 28, of which in each case only one is provided with a dedicated reference sign. As viewed perpendicular to the layer plane of the metal layer 11, the profiling 19 is arranged adjacent to the profilings 16a and 16b and between the latter. The profiled web 30 further increases the pressure of the metal layer 11 against the liner 3 and leads to a further improved sealing effect. In each case a non-profiled region is located opposite the profilings 16a, 16b, 19 on the respective opposite surface of the metal layer 11.

Figure 2E:
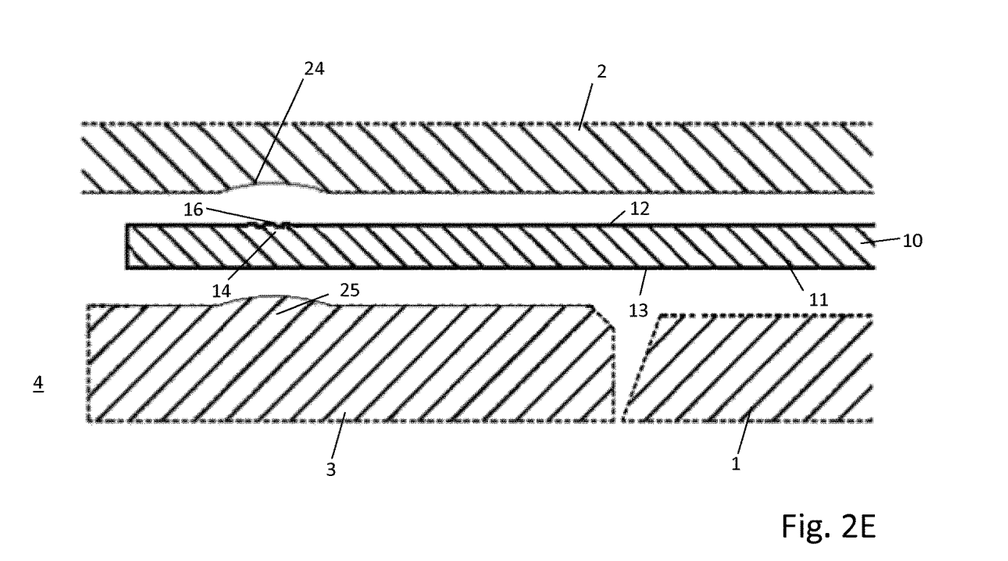

FIG. 2E shows a further embodiment of a flat gasket according to the invention, similar to that in FIG. 2C and according to the second variant of the present invention. In a manner differing from FIG. 2C, the second surface 13 of the metal layer 11 is now smooth. In addition, in the area of the first region 14, that is to say opposite the first region 14 and perpendicular to the layer plane, that is to say perpendicular to the neutral axis of the metal layer 11, the liner 3 has, below the region 14, a raised area 25 having a height of approximately 100 μm, which upon assembly additionally leads to an increase in pressure between the layer 11 and the cylinder head 2. Furthermore, the cylinder head has a depression 24 at the corresponding location, that is to say opposite the region 14, so that overall the metal layer 11 in the region 14 between the raised area 25 and the depression 24 spans a depth of approximately 80 μm. In this case, a convexly raised region is formed upon assembly, so that the first region 14 upon assembly is transformed into a convexly raised region, as shown in the other exemplary embodiments. The profiling 16 remains largely intact during this.

Figure 2F:
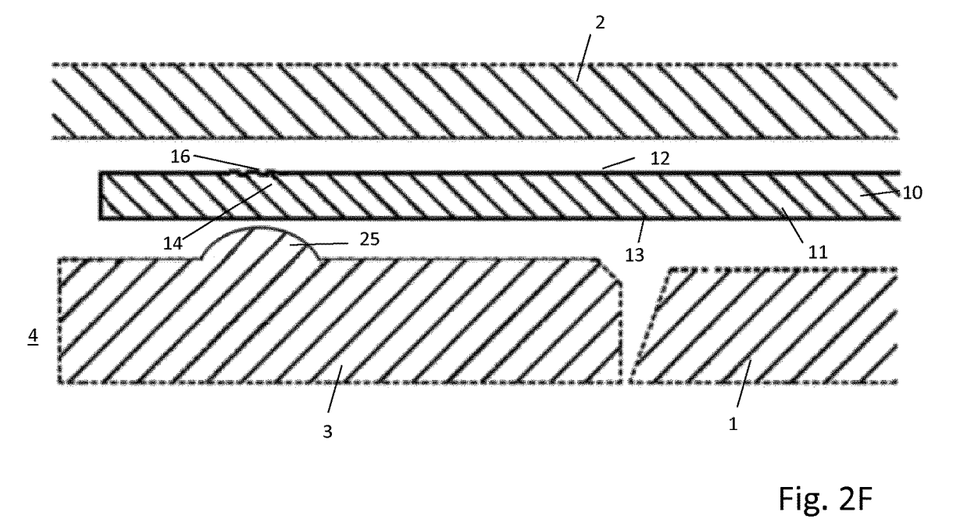

FIG. 2F shows a further embodiment of a flat gasket according to the invention, comparable to that in FIG. 2E. Here, however, the raised area 25 of the liner 3 is, at 300 μm, much higher than the raised area 25 of the liner 3 of FIG. 2E, while the thickness of the flat gasket 10 is again 1 mm. In contrast, no depression 24 is present in the cylinder head 2. Given a suitably selected rigidity of the components 1, 2, 3 and of the sheet material of the sealing layer(s), a raised area 25 alone is sufficient to produce a convexly raised first region upon assembly. Both in FIG. 2E and in FIG. 2F, the height of the elevations 17 relative to the depressions 18 is approximately 40 μm.

Figure 2G:
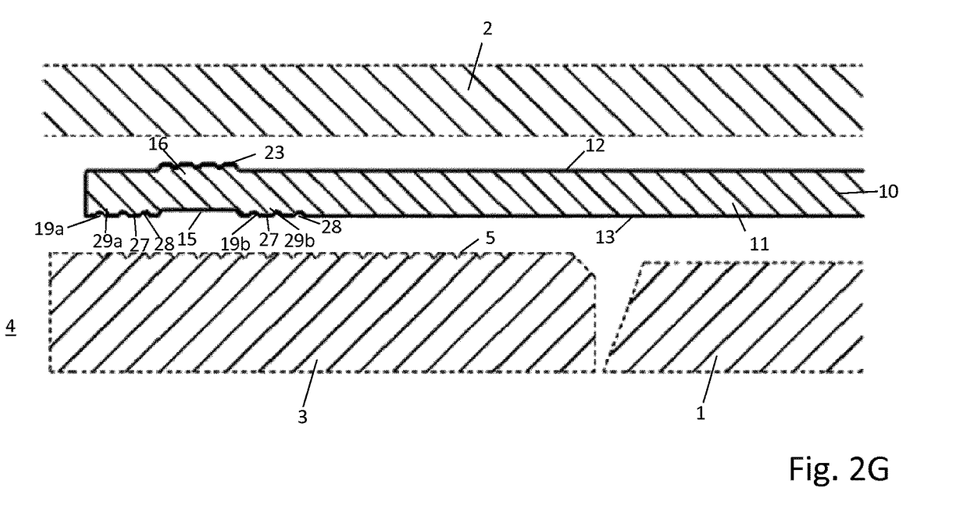

FIG. 2G shows a further inventive flat gasket 10 according to the first variant of the invention, which corresponds to that in FIG. 2C. In addition to the concave second region 15, which is arranged opposite the convexly raised region 23, in each case a third region 29a, 29b having second profilings 19a and 19b is now provided in the second surface 13 and on both sides adjacent to the smooth second region 15 in the second surface 13, as seen in plan view towards the layer plane of the metal layer 11. Said profilings 19a, 19b are provided only in the second side 13, while the surface is planar on the opposite first side 12 in the region adjacent to the profiling 16. The profilings 19a, 19b are thus not located directly opposite the convexly raised first region 23 with its profiling 16, but rather are offset laterally outside of the second region 15.

Figure 2H:
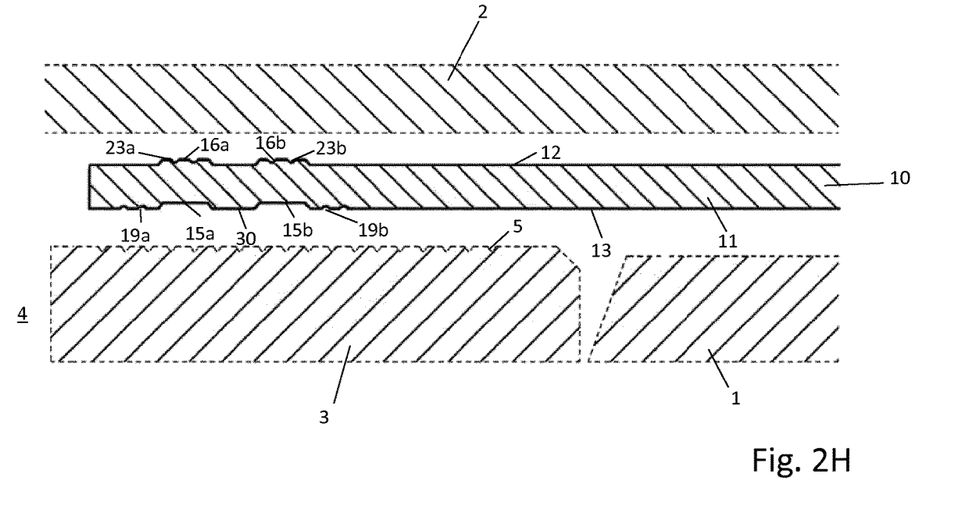

FIG. 2H shows a further embodiment of a flat gasket 10 according to the invention which largely corresponds to that in FIG. 2G with regard to the profiling 19 on both sides adjacent to the second region 15. In a manner differing from FIG. 2G, however, the first region 23 and the second region 15 are present twice, as first regions 23a and 23b and second regions 15a and 15b, while a web 30 is provided in the second surface 13 between the regions 15a and 15b. Said web 30 is not profiled.

Figure 2I:
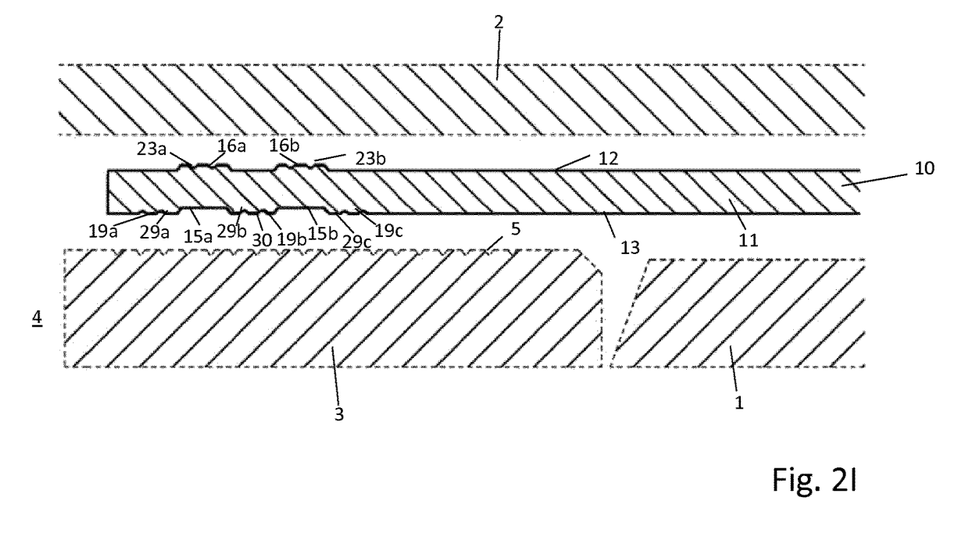

FIG. 2I shows a further flat gasket 10 according to the invention, corresponding to that in FIG. 2H. In a manner differing from FIG. 2H, however, the web 30 provided between the regions 15a and 15b in the second layer 13 is now also profiled and thus forms a third region 29b. Here, all the profilings 16a, 16b, 19a, 19b, 19c have three elevations which are separated from one another by two depressions. Here, too, the profilings 16a, 16b of the first surface 12 are offset radially (relative to the combustion chamber opening 4) from the profilings 19a, 19b, 19c of the second surface 13, that is to say from the third regions 29a, 29b, 29c. Reference signs for the depressions and elevations have been omitted here for the sake of clarity.

Figure 2J:
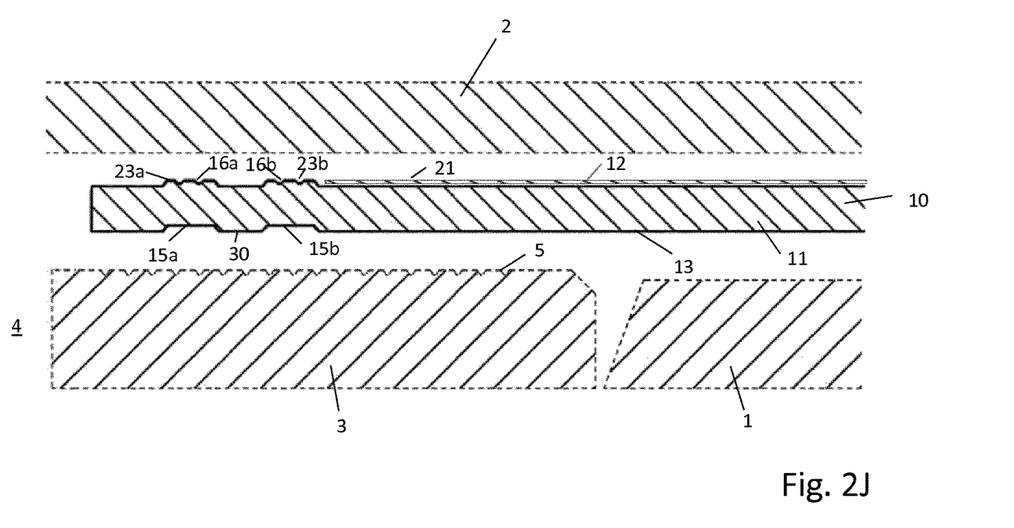

FIG. 2J shows a further flat gasket 10 according to the invention, corresponding to that in FIG. 2H. In a manner differing from FIG. 2H, however, the second surface 13 is not profiled at any point. In addition, a shortened further sealing layer 21 is provided, which extends over the first layer 11 and, on the side of the convexly raised first region 23 remote from the through-opening 4, as far as said convexly raised region 23b.

FIG. 3 shows a portion of further flat gaskets 10 according to the invention, in an oblique view in each case. The flat gasket in FIG. 3A is similar to that of the prior art in FIG. 5. However, instead of the beads 26 with relatively shallow bead limbs, omega-shaped embossments with raised first regions 23a and 23b are now present in cross-section through the layer, these having much steeper sloping flanks. In addition, the first surface 12 in the top of said omega embossments is now profiled with three elevations 17, 17' and 17" or 17b, 17b' and 17b" and two depressions 18, 18' or 18b, 18b' located therebetween. No such profilings are found on the opposite second surface 13.

Figure 3A:
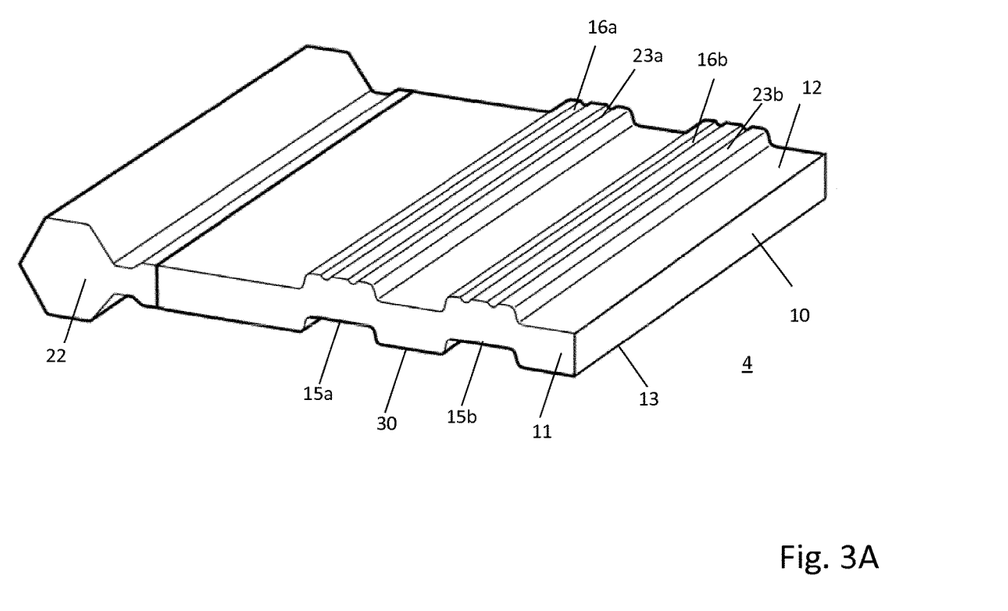
FIGS. 3A to 3D show portions of further flat gaskets according to the invention, in perspective cross-section.
Figure 3B:
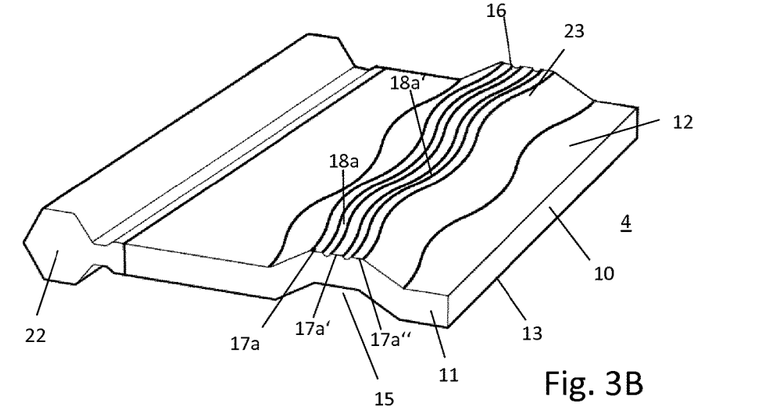

FIG. 3B shows a further flat gasket 10 according to the invention, in which only one convexly raised first region 23 is present, which meanders along a through-opening 4. The convexly raised region 23 is configured in a manner similar to the beads 26 of the prior art. Three elevations 17, 17', 17" run approximately centrally on the top surface of the convexly raised region 23, with two depressions 18, 18' arranged therebetween. Both the elevations and the depressions meander with the bead top. In order to seal coolant or lubricant through-openings, for example, the flat gasket 10 has a moulding 22. Once again, an elastomeric moulded-on seal 22 is provided.

Figure 3C:
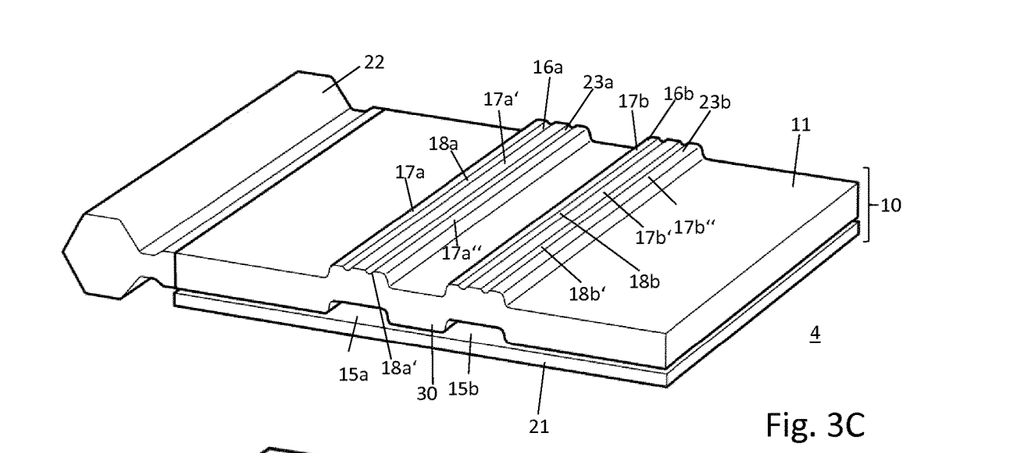

FIG. 3C shows a further flat gasket 10 according to the invention, corresponding to the flat gasket shown in FIG. 3A. In addition to the first layer 11, a smooth sheet is arranged here as a further layer 21 between the first layer 11 and a crankcase (not shown) or a liner (not shown).

Figure 3D:
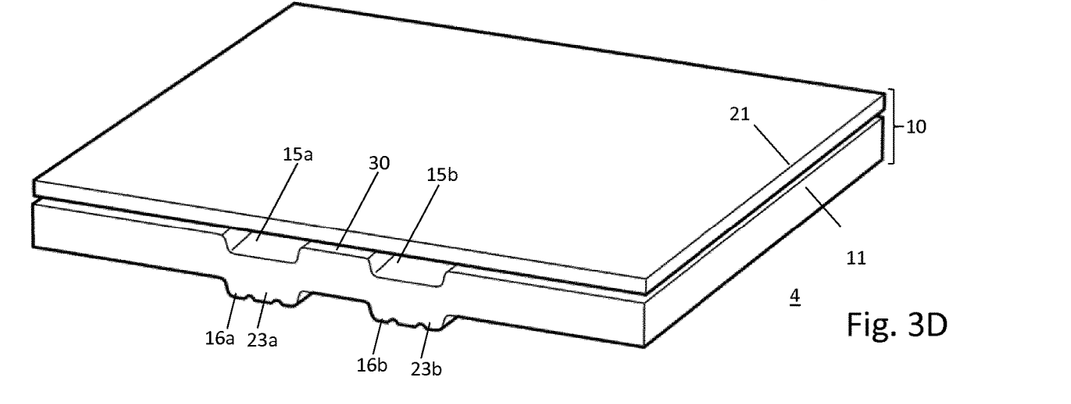

FIG. 3D shows a further flat gasket 10 according to the invention. Apart from the fact that there is no moulding 22, it largely corresponds to that of FIG. 3C, but the flat gasket 10 of FIG. 3D is the other way round compared to that of FIG. 3C, that is to say the smooth sheet layer 21 now faces towards the upper adjoining component (not shown here), while the profilings 16a, 16b point towards the lower adjoining component.

Figure 4:
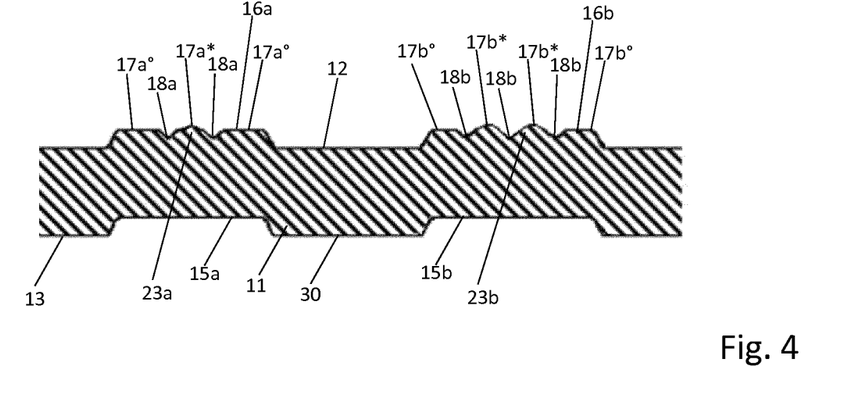
FIG. 4 shows a portion of a cross-section of a further flat gasket according to the invention.

FIG. 4 shows a portion of a cross-section of a sealing layer 11. In the first region 23a shown on the left, which is convexly raised above the surface 11, a profiling 16a is formed in the sealing layer 11, said profiling having three elevations 17a, 17a* and 17a° with two depressions 18a located between said elevations. Relative to the two depressions 18a, the two end elevations 17a° at approximately 30 μm have a smaller height H than the middle elevation 17a* at 40 μm. Here, the convexly raised region is mirror-symmetrical in relation to the central line through the elevation 17a*. The total width of the convexly raised region is approximately 950 μm. At the half-way height between the maximum of the elevation 17a* and the minimum of a depression 18a, this is distributed as approximately 50 μm for each depression 18a, 300 μm for each elevation 17a°, and 250 μm for the elevation 17a*.

In the region 23b shown on the right in FIG. 4, which is convexly raised above the surface 11, a somewhat different profiling 16b is formed in the sealing layer 11. Here, three depressions 18b are located between four elevations 17b°, 17b*, 17b*, 17b°. Once again, the end elevations 17b° are shorter than the elevations 17b* located in the centre. Here, the heights relative to the depressions 18b are 35 and 50 μm. The total width of the convexly raised region 23b is approximately 1250 μm; once again the depressions 18b have a width of approximately 50 μm, the elevations 17b° have a width of approximately 300 μm, and the elevations 17b* have a width of approximately 250 μm. The width measurements are once again taken at the half-way height between the minimum of a depression and the maximum of the elevations, that is to say the maximum of the elevations 17b*.

FIG. 4 shows profilings having elevations of different height and depressions of different depth, based on the example of first profilings 16a, 16b. It is also possible to configure a second profiling 19 with elevations of different height and/or depressions of different depth.

The invention claimed is:

1. A flat gasket for sealing between mutually facing surfaces of a crankcase and of a cylinder head of an internal combustion engine around a through-opening which passes through the entire flat gasket, comprising:
a first metal layer with a first side having a first surface and with a second side having a second surface, and at least one first region which runs on the first side around the through-opening,
wherein the first region is convexly raised,
wherein the first region on the first surface has a first profiling which is integrally formed in the first surface and which extends on the first region around the through-opening, and
the first profiling has, transversely to the direction of extension thereof and in an alternating fashion, elevations which repeat at least once and in each case a depression between each two adjacent elevations,
wherein a width BS of the convexly raised first region is greater than or equal to 800 μm and a width BP of a single elevation in the first profiling less than 400 μm.

2. The flat gasket according to claim 1, wherein the second surface has, in a second region located opposite the first region, no profiling with elevations and/or depressions, including no profiling with elevations and/or depressions of equal dimensions to those of the first profiling.

3. The flat gasket according to claim 1, wherein the second surface has, in at least one third region which is directly or indirectly adjacent to at least one second region arranged in the second surface opposite the first region, including in a third region arranged between two different second regions, a second profiling with elevations and/or depressions, said second profiling being integrally formed in the second surface and extending around the through-opening.

4. The flat gasket according to claim 3, wherein the second profiling has, transversely to the direction of extension and in an alternating fashion, elevations which repeat at least once and in each case a depression between each two adjacent elevations,
wherein the second profiling and/or the first profiling may have identical or different structures.

5. The flat gasket according to claim 4, wherein the height or depth of the elevations and depressions of the second profiling is smaller than the height or depth of the elevations and depressions of the first profiling.

6. The flat gasket according to claim 1, wherein the elevation of the first profiling that is arranged centrally in the first region or the elevations of the first profiling that are arranged on either side of the centre of the first region and at the smallest distance from said centre are higher than one, some or all of the elevations adjacent thereto.

7. The flat gasket according to claim 3, wherein the elevation of the second profiling that is arranged centrally in the third region or the elevations of the second profiling that are arranged on either side of the centre of the third region and at the smallest distance from said centre are higher than one, some or all of the elevations adjacent thereto.

8. The flat gasket according to claim 1, wherein for a layer thickness D of the metal layer in the first region and for a height H between the elevation and the adjacent depression, $D \geq H$.

9. The flat gasket according to claim 8, wherein $H \leq 0.25$ mm.

10. The flat gasket according to claim 1, wherein the width of a depression is equal to or greater than 100 μm.

11. The flat gasket according to claim 1, wherein a raised height HS of the first region is $HS \geq 0.07$ mm.

12. The flat gasket according to claim 3, wherein the first and/or second profiling extends largely parallel to the direction of extension of the first region.

13. The flat gasket according to claim 1, further comprising one or more further metal layers, which are arranged adjacent to the first metal layer.

14. The flat gasket according to claim 3, wherein the second and/or third region is of convex shape.

15. The flat gasket according to claim 3, wherein the first metal layer in the first, second and/or third region is configured as a bead.

16. The flat gasket according to claim 1, wherein the first metal layer is made of or contains carbon steel or a non-spring-tempered stainless steel.

17. The flat gasket according to claim 1, wherein the flat gasket is arranged between a crankcase and a cylinder head, with the first surface of said flat gasket pointing towards the cylinder head and the second surface pointing towards the crankcase.

18. The flat gasket according to claim 17, wherein the crankcase has at least one liner and the first region of the metal layer, in projection into a common plane, is arranged in the region of the liner and/or adjacent to the liner.

19. The flat gasket according to claim 17, wherein the crankcase has at least one liner which has a region that runs adjacent to and parallel to the first region around the through-opening and bulges upwards in relation to the radially inwardly and/or outwardly adjoining regions of the surface of the crankcase.

* * * * *